United States Patent
Wang et al.

(10) Patent No.: US 10,443,714 B2
(45) Date of Patent: Oct. 15, 2019

(54) SYSTEMS AND METHODS FOR CONTROLLING A TRANSMISSION AND AN ENGINE WITH A COMBINATION PARK AND IGNITION SWITCH

(71) Applicant: GM Global Technology Operations LLC, Detroit, MI (US)

(72) Inventors: Orson S. Wang, Novi, MI (US); Fred W. Huntzicker, Ann Arbor, MI (US); Michael A. Van Camp, Swartz Creek, MI (US); Pratyush Kumar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 180 days.

(21) Appl. No.: 15/637,288

(22) Filed: Jun. 29, 2017

(65) Prior Publication Data

US 2019/0003581 A1   Jan. 3, 2019

(51) Int. Cl.

| | |
|---|---|
| *F16H 61/02* | (2006.01) |
| *F16H 59/10* | (2006.01) |
| *F16H 59/44* | (2006.01) |
| *B60W 50/00* | (2006.01) |
| *F16H 59/74* | (2006.01) |

(52) U.S. Cl.
CPC ....... *F16H 61/0213* (2013.01); *F16H 59/105* (2013.01); *F16H 59/44* (2013.01); *F16H 61/0206* (2013.01); *B60W 2050/0043* (2013.01); *F16H 2059/746* (2013.01); *F16H 2312/12* (2013.01)

(58) Field of Classification Search
CPC ............ F16H 61/0213; F16H 61/0206; F16H 61/0204; F16H 59/44; F16H 2059/746; F16H 2312/12; B60W 2050/0043; B60W 2050/0065; B60W 30/08; B60W 2540/06; B60W 10/06; B60W 2710/0677
See application file for complete search history.

(56) References Cited

U.S. PATENT DOCUMENTS

| | | | |
|---|---|---|---|
| 4,932,493 A * | 6/1990 | Sakurai | B60R 25/02144 180/271 |
| 5,736,935 A | 4/1998 | Lambropoulos | |
| 6,500,092 B2 | 12/2002 | Syamoto | |
| 7,104,923 B2 | 9/2006 | Nakane et al. | |
| 7,161,262 B2 | 1/2007 | Nagae et al. | |
| 7,204,785 B2 * | 4/2007 | Berger | B60W 10/113 192/219.5 |
| 8,414,455 B2 | 4/2013 | McCullough et al. | |

(Continued)

*Primary Examiner* — Tinh T Dang (57) ABSTRACT

A drive control system of a vehicle includes a vehicle speed module configured to determine whether the vehicle is moving and set a state of a signal based on the determination. A shift control module is configured to shift a transmission of the vehicle based on a signal from a range selector. Independently of the signal from the range selector, the shift control module is configured to selectively shift the transmission of the vehicle based on a signal from a combination park and ignition switch and the signal from the vehicle speed module. An ignition control module is configured to selectively shut down an engine of the vehicle based on the signal from the combination park and ignition switch and the signal from the vehicle speed module.

20 Claims, 4 Drawing Sheets

(56) References Cited

U.S. PATENT DOCUMENTS

| | | | |
|---|---|---|---|
| 8,457,859 B2* | 6/2013 | Drogosch | B60W 30/18018 |
| | | | 180/178 |
| 8,801,570 B2* | 8/2014 | Choi | B60R 25/24 |
| | | | 477/99 |
| 8,904,984 B2* | 12/2014 | Hanft | F02N 11/0803 |
| | | | 123/179.4 |
| 10,024,431 B2* | 7/2018 | Parker, Jr. | B60T 17/22 |
| 2005/0288151 A1 | 12/2005 | Yamamoto | |
| 2007/0135262 A1 | 6/2007 | Cho | |
| 2016/0186859 A1* | 6/2016 | Parker, Jr. | B60T 17/22 |
| | | | 701/51 |
| 2017/0225654 A1* | 8/2017 | de Almeida | B60S 1/0896 |
| 2019/0003581 A1* | 1/2019 | Wang | F16H 59/44 |

* cited by examiner

SYSTEMS AND METHODS FOR CONTROLLING A TRANSMISSION AND AN ENGINE WITH A COMBINATION PARK AND IGNITION SWITCH

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to controlling both a transmission of the vehicle and an engine of the vehicle with a combination park and ignition switch.

A vehicle may include an electronic transmission range selector (ETRS) used by a driver to control operation of a transmission of the vehicle. For example, the ETRS shifts the transmission to park when the driver inputs a request to shift the transmission to park via the ETRS.

The vehicle may also include an ignition switch that is separate from the ETRS that controls an ignition system of the vehicle. For example, when the engine is off, actuation of the ignition switch may start the engine or put the vehicle in an accessory mode. In the accessory mode, the engine of the vehicle is off, but power is supplied to various accessories of the vehicle. For example, power may be supplied to a radio, an infotainment system, and/or one or more other vehicle accessories during operation in the accessory mode. When the engine is on, actuation of the ignition switch may shut down the engine.

SUMMARY

A drive control system of a vehicle includes a vehicle speed module, a shift control module, and an ignition control module. The vehicle speed module is configured to determine whether the vehicle is moving. The vehicle speed module sets a first signal to a first state when the vehicle is not moving and sets the first signal to a second state when the vehicle is moving. The shift control module is configured to shift a transmission of the vehicle based on a second signal from a range selector. Independently of the second signal from the range selector, the shift control module is configured to selectively shift the transmission of the vehicle when a third signal from a combination park and ignition switch is in a first state. The ignition control module is configured to, when the first signal is in the first state and the transmission of the vehicle is in park, shut down an engine of the vehicle when the third signal from the combination park and ignition switch is in the first state.

In other features, the vehicle does not include any ignition switches other than the combination park and ignition switch.

In other features, the shift control module is configured to shift the transmission of the vehicle based on the second signal from the range selector both when the first signal is in the first state and when the first signal is in the second state.

In other features, the drive control system includes a first timer module configured to set a fourth signal to a first state when the third signal is in the first state continuously for a first predetermined period. The shift control module is configured to shift the transmission to neutral when the fourth signal is in the first state, the first signal is in the second state, and the transmission is not in park.

In other features, the ignition control module is configured to shut down the engine of the vehicle when the fourth signal is in the first state and the first signal is in the second state.

In other features, the shift control module is configured to shift the transmission of the vehicle to park when the first signal is in the first state, the third signal is in the first state, and the transmission of the vehicle is not in park.

In other features, the drive control system includes a second timer module configured to set a fifth signal to a first state when the third signal from the combination park and ignition switch is in the first state continuously for a second predetermined period. The ignition control module is further configured to shut down the engine of the vehicle when the first signal is in the first state and the fifth signal is in the first state.

In other features, the ignition control module is configured to start the engine of the vehicle when the third signal from the combination park and ignition switch is in the first state and the engine is off.

In other features, the ignition control module is configured to start the engine of the vehicle when the third signal from the combination park and ignition switch is in the first state, the engine is off, and the transmission of the vehicle is in one of park and neutral.

In other features, the vehicle speed module is configured to set the first signal to the first state when a speed of the vehicle is less than a predetermined speed and set the first signal to the second state when the speed of the vehicle is greater than or equal to the predetermined speed.

In other features, the shift control module is configured to, when the first signal is in the first state and the transmission is not in park, shift the transmission to park in response to the third signal from the combination park and ignition switch transitioning to the first state. The ignition control module is configured to, when the first signal is in the first state and the transmission is not in park, shut down the engine in response to the third signal from the combination park and ignition switch remaining in the first state continuously for a first predetermined period.

In other features, the shift control module is configured to, when the first signal is in the second state and the transmission is not in park, shift the transmission to neutral in response to the third signal from the combination park and ignition switch remaining in the first state continuously for a second predetermined period. The ignition control module is configured to, when the first signal is in the second state and the transmission is not in park, shut down the engine in response to the third signal from the combination park and ignition switch remaining in the first state continuously for the second predetermined period.

In other features, the shift control module is configured to, when the first signal is in the first state and the transmission is not in park, shift the transmission to park in response to the third signal from the combination park and ignition switch transitioning to the first state. The ignition control module is configured to, when the first signal is in the first state and the transmission is not in park, shut down the engine in response to the third signal from the combination park and ignition switch transitioning to the first state.

In other features, the shift control module is configured to, when the first signal is in the second state and the transmission is not in park, shift the transmission to neutral in response to the third signal from the combination park and ignition switch remaining in the first state continuously for a second predetermined period. The ignition control module is configured to, when the first signal is in the second state and the transmission is not in park, shut down the engine in response to the third signal from the combination park and ignition switch remaining in the first state continuously for the second predetermined period.

In other features, the drive control system includes the range selector and the combination park and ignition switch. The combination park and ignition switch is configured to set the third signal to the first state in response to user input to the combination park and ignition switch and set the third signal to a second state in response to no user input to the combination park and ignition switch.

A drive control method for a vehicle includes: determining whether the vehicle is moving; in response to determining that the vehicle is not moving, setting a first signal to a first state; and in response to determining that the vehicle is moving, setting the first signal to a second state. The drive control method for a vehicle also includes: shifting a transmission of the vehicle based on a second signal from a range selector; independently of the second signal from the range selector, selectively shifting the transmission of the vehicle when a third signal from a combination park and ignition switch is in a first state; and shutting down an engine of the vehicle when the first signal is in the first state, the transmission of the vehicle is in park, and the third signal from the combination park and ignition switch is in the first state.

In other features, the drive control method includes setting a fourth signal to a first state when the third signal is in the first state continuously for a first predetermined period, and selectively shifting the transmission of the vehicle when the third signal from the combination park and ignition switch is in the first state includes shifting the transmission to neutral when the fourth signal is in the first state, the first signal is in the second state, and the transmission of the vehicle is not in park.

In other features, the drive control method includes shutting down the engine of the vehicle when the fourth signal is in the first state and the first signal is in the second state.

In other features, shifting the transmission of the vehicle when the third signal from the combination park and ignition switch is in the first state includes shifting the transmission to park when the first signal is in the first state and the transmission of the vehicle is not in park.

In other features, the drive control method includes setting a fifth signal to a first state when the third signal is in the first state continuously for a second predetermined period, and shutting down the engine of the vehicle when the first signal is in the first state and the fifth signal is in the first state.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include an ignition switch and an electronic transmission range selector (ETRS) that includes a park switch. A transmission control module (TCM) shifts a transmission of the vehicle to park in response to actuation of the park switch. An engine control module (ECM) shuts down the engine in response to actuation of an ignition switch. Thus, actuation of two separate switches, which may be located apart from each other, may be required to shift the transmission to park and to shut down the engine.

According to the present disclosure, the ETRS may include a combination park and ignition switch. When the vehicle is not in motion, in response to actuation of the combination park and ignition switch, the TCM shifts the transmission to park and the ECM selectively shuts down the engine. When the vehicle is in motion, in response to actuation of the combination park and ignition switch, the TCM shifts the transmission to neutral and the ECM selectively shuts down the engine. When the engine is off, the ECM starts the engine in response to actuation of the combination park and ignition switch.

The use of the single combination park and ignition switch may improve usability of a vehicle by eliminating the need for a driver to actuate two separate switches. Additionally, the use of a combination park and ignition switch may reduce the total number of switches implemented in the vehicle as a separate ignition switch may not be needed. A reduction of the number of switches implemented in the vehicle may reduce the overall cost of the vehicle.

Figure 1:
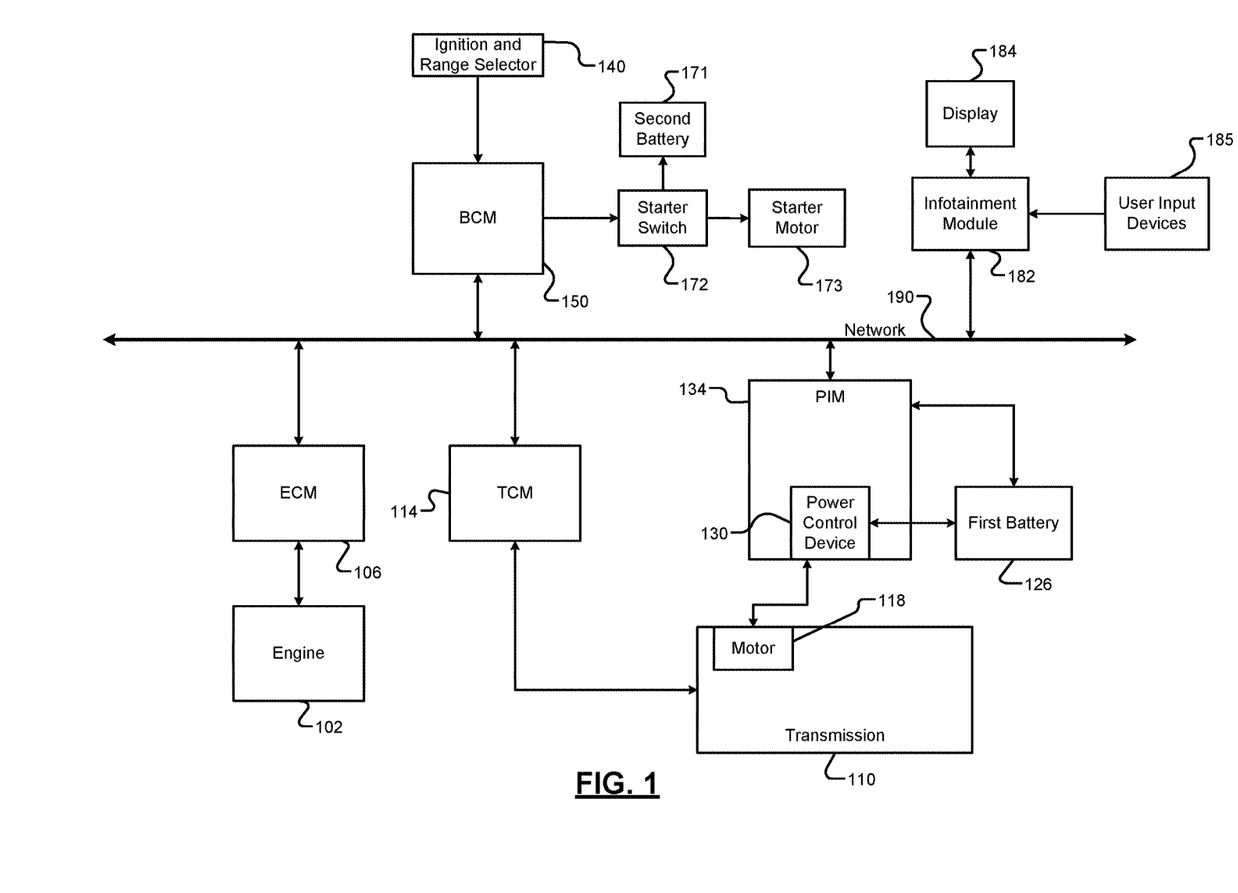
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles.

An engine 102 combusts an air/fuel mixture to generate drive torque. An engine control module (ECM) 106 controls the engine 102 based on a torque request, such as a torque request determined based on driver input. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. The ECM 106 may also control shutdown of the engine 102. To shut down the engine 102, the ECM 106 disables fuel flow to the engine 102. The ECM 106 may also disable spark and/or actuate one or more other engine actuators for engine shutdown.

The engine 102 outputs torque to a transmission 110. A transmission control module (TCM) 114 controls operation of the transmission 110. For example, the TCM 114 may control gear selection within the transmission 110 and control actuation of one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a first battery 126 via a power control device (PCD) 130. When acting as a motor, an electric motor generates torque that may be used, for example, to supplement or replace torque output by the engine 102. While the example of one electric motor is provided, the vehicle system may include zero or more than one electric motor.

A power inverter control module (PIM) 134 may control the electric motor 118 and the PCD 130. The PCD 130 applies (e.g., direct current) power from the first battery 126 to the (e.g., alternating current) electric motor 118 based on signals from the PIM 134, and the PCD 130 provides power output by the electric motor 118, for example, to the first battery 126. The PIM 134 may be referred to as a power inverter module (PIM) in various implementations.

The vehicle system may include an ignition and range selector 140. The ignition and range selector 140 includes a combination park and ignition switch and a range selector (an ETRS). The combination park and ignition switch may include, for example, a first one or more input devices (e.g., switches, buttons, etc.) and generates a park and ignition signal based on user interaction with the first one or more input devices. In various implementations, the park and ignition signal may be provided to a body control module (BCM) 150.

The BCM 150 may control an ignition state of the vehicle based on the park and ignition signal. At a given time, the ignition state may be one of: off, accessory, run, or crank. The range selector may include, for example, a second one or more input devices (e.g., switches, buttons, levers, joysticks, rotary dials, etc.) and generates a range signal based on user interaction with the second one or more input devices. The TCM 114 controls the transmission 110 based on the range signal.

The vehicle system may include a second battery 171, a starter switch 172, and a starter motor 173 used to start the engine 102. For example, when the ignition state is crank, the BCM 150 closes the starter switch 172 and supplies the starter motor 173 with power from the second battery 171. When supplied with power from the second battery 171, the starter motor 173 engages (e.g., a flywheel of) the engine 102 and drives rotation of a crankshaft of the engine 102. The ECM 106 supplies fuel and spark to the engine 102 as the crankshaft rotates.

The vehicle system may also include an infotainment module 182. The infotainment module 182 controls what is displayed on a display 184 located within a passenger cabin of the vehicle. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

Modules of the vehicle system may share parameters via a network 190, such as a controller area network (CAN). The CAN may also be referred to as a car area network. For example, the network 190 may include one or more data buses. Various parameters may be made available by a given control module to other control modules via the network 190.

Figure 2:
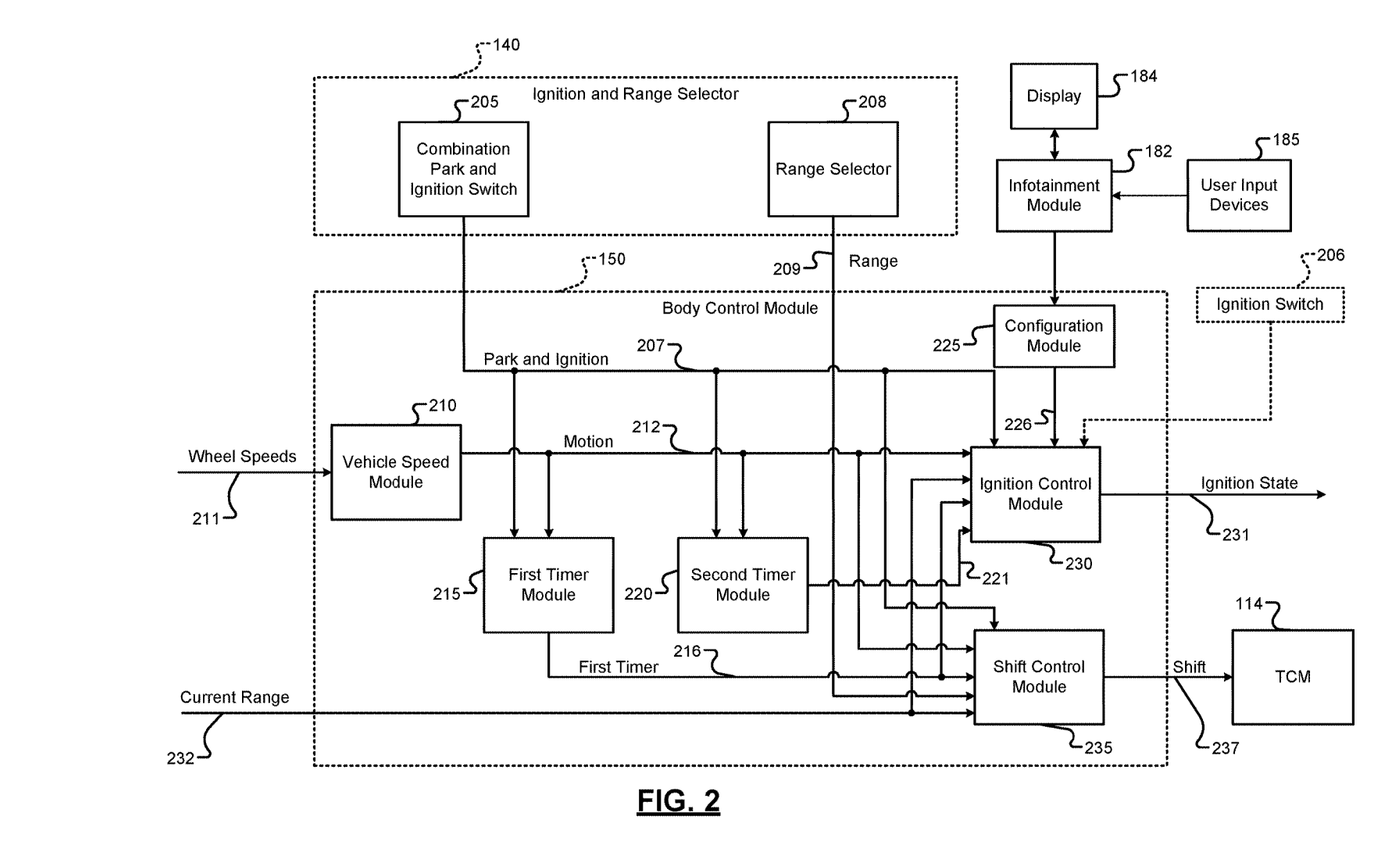
FIG. 2 is a functional block diagram of an example drive control system.

FIG. 2 is a functional block diagram of an example implementation of a drive control system. The drive control system may include the ignition and range selector 140, a vehicle speed module 210, a first timer module 215, a second timer module 220, a configuration module 225, an ignition control module 230, and a shift control module 235. The vehicle speed module 210, the first timer module 215, the second timer module 220, the configuration module 225, the ignition control module 230, and the shift control module 235 may be implemented in the BCM 150, as depicted in the example of FIG. 2. In other examples, at least one of the vehicle speed module 210, the first timer module 215, the second timer module 220, the configuration module 225, the ignition control module 230, and the shift control module 235, the may be implemented independently or with one or more other modules of the vehicle. For example, the shift control module 235 may be implemented in the TCM 114.

The ignition and range selector 140 includes a combination park and ignition switch 205. In one example, the combination park and ignition switch 205 is the only ignition switch in the vehicle. In other words, the vehicle may not include any ignition switches other than the combination park and ignition switch 205. In other examples, the vehicle may include an ignition switch 206 in addition to the combination park and ignition switch 205.

The combination park and ignition switch 205 sets the state of a park and ignition signal 207 based on user interaction with (e.g., actuating, touching, etc.) the combination park and ignition switch 205. The combination park and ignition switch 205 sets the park and ignition signal 207 to a first state when the user is interacting with (e.g., actuating, touching, etc.) the combination park and ignition switch 205. The combination park and ignition switch 205 sets the park and ignition signal 207 to a second state when the combination park and ignition switch 205 is not being interacted with (e.g. actuated or touched).

The ignition and range selector 140 also includes a range selector 208. The range selector 208 sets the state of a range signal 209 based on user interaction with the range selector 208. For example, the range selector 208 may set the state of the range signal 209 to a first state (corresponding to neutral) based on user interaction (e.g., actuation, touching, etc.) with the range selector 208 to operate the transmission 110 in neutral. The range selector 208 may set the state of the range signal 209 to a second state (corresponding to drive) based on user interaction (e.g., actuation, touching, etc.) with the range selector 208 to operate the transmission 110 using forward drive gears. The range selector 208 may set the state of the range signal 209 to a third state (corresponding to reverse) based on user interaction (e.g., actuation, touching, etc.) with the range selector 208 to operate the transmission 110 using one or more reverse drive gears. The range selector 208 may set the state of the range signal 209 to a fourth state (corresponding to park) based on user interaction (e.g., actuation, touching, etc.) with the range selector 208 to operate the transmission 110 in park, and so on. The TCM 114 may shift the transmission 110 based on the range signal 209.

The vehicle speed module 210 determines whether the vehicle is in motion based on a speed of the vehicle ("vehicle speed"). The vehicle speed module 210 determines the vehicle speed based on one or more wheel speeds 211 measured using one or more wheel speed sensors, respectively. For example, the vehicle speed module 210 may determine the vehicle speed based on an average of two or more of the wheel speeds 211. When the vehicle speed is greater than or equal to a predetermined speed, the vehicle speed module 210 determines that the vehicle is in motion and sets a motion signal 212 to a first state. When the vehicle speed is less than the predetermined speed, the vehicle speed module 210 determines that the vehicle is not in motion and sets the motion signal 212 to a second state. The motion signal 212 therefore indicates whether the vehicle is in motion or not. For example only, the predetermined speed may be 5 kilometers per hour ("KPH"). In other examples, the predetermined speed may be approximately 2-5 KPH or another suitable speed.

The first timer module 215 generates a first timer value that indicates how long (i.e., a period) the combination park and ignition switch 205 has been continuously in the first state. The first timer module 215 resets the first timer value when the park and ignition signal 207 is in the second state. The first timer module 215 increments the first timer value when the park and ignition signal 207 is in the first state. In various implementations, the first timer module 215 may also reset the first timer value before beginning to increment the first timer value when the park and ignition signal 207 transitions from the second state to the first state.

When the first timer value is less than a first predetermined period (or value), the first timer module 215 sets a first timer signal 216 to a first state. When the first timer value is equal to or greater than the first predetermined period, the first timer module 215 sets the first timer signal 216 to a second state. For example only, the first predetermined period may be or correspond to approximately two seconds or another suitable period. Thus, the first timer module 215 sets the first timer signal 216 to the second state in response to user interaction with the park and ignition switch 205 continuously for at least the first predetermined period.

The second timer module 220 generates a second timer value that indicates how long (i.e., a period) the combination park and ignition switch 205 has been continuously in the first state. The second timer module 220 resets the second timer value when the park and ignition signal 207 is in the second state. The second timer module 220 increments the second timer value when the park and ignition signal 207 is in the first state. In various implementations, the second timer module 220 may also reset the second timer value before beginning to increment the second timer value when the park and ignition signal 207 transitions from the second state to the first state.

When the second timer value is less than a second predetermined period (or value), the second timer module 220 sets a second timer signal 221 to a first state. When the second timer value is equal to or greater than the second predetermined period, the second timer module 220 sets the second timer signal 221 to a second state. For example only, the second predetermined period may be or correspond to approximately one second or another suitable period. Thus, the second timer module 220 sets the second timer signal 221 to the second state in response to user interaction with the park and ignition switch 205 continuously for at least the second predetermined period.

The configuration module 225 sets a state of a configuration signal 226. The configuration module 225 may set the state of the configuration signal 226, for example, based on user input, such as input received from the infotainment module 182 (e.g., via the display 184). The state of the configuration signal 226 indicates how to control the engine 102 and the transmission 110 while the vehicle is not in motion and the transmission 110 is not in park in response to user interaction with the combination park and ignition switch 205. For example, when the configuration signal 226 is in a first state, the motion signal 212 is in the second state, and the transmission 110 is not in park, in response to interaction with the combination park and ignition switch 205, the ignition control module 230 shuts down the engine 102 and the shift control module 235 shifts the transmission 110 to park. When the configuration signal 226 is in a second state, the motion signal 212 is in the second state, and the transmission 110 is not in park, in response to interaction with the combination park and ignition switch 205 for the first predetermined period, the shift control module 235 shifts the transmission 110 to park. In response to interaction with the combination park and ignition switch 205 for greater than the second predetermined period, the ignition control module 230 shuts down the engine 102.

The ignition control module 230 sets an ignition state 231 based on the park and ignition signal 207, the motion signal 212, the first timer signal 216, the second timer signal 221, the configuration signal 226, and a current range signal 232. The current range signal 232 indicates a present range (e.g., park, reverse, neutral, or drive) of the transmission 110. The TCM 114 may provide the current range signal 232. The ignition state 231 may be one of: off, accessory, run, and crank.

The shift control module 235 may set the state of a shift signal 237 based on the range signal 209. Independently of the of the range signal 209, the shift control module 235 may also set the state of the shift signal 237 based on the park and ignition signal 207, the motion signal 212, the first timer signal 216, and the current range signal 232. The TCM 114 shifts the transmission 110 based on the state of the shift signal 237.

When the vehicle is in motion and the user interacts with the combination park and ignition switch 205 for at least the first predetermined period, the ignition control module 230 shuts down the engine 102 and the shift control module 235 shifts the transmission to neutral. Specifically, when the motion signal 212 is in the first state and the first timer signal 216 is in the second state, the ignition control module 230 may transition the ignition state 231 from run to accessory and the shift control module 235 may set the shift signal 237 to a first state. In response to the shift signal 237 being set to the first state, the TCM 114 shifts the transmission 110 to neutral. In response to the ignition control module 230 transitioning the ignition state 231 to accessory, the ECM 106 shut downs the engine 102. In one example, the ECM 106 may wait until the motion signal 212 indicates that the vehicle is not in motion (the motion signal 212 is in the second state) to shut down the engine 102. In other examples, the ECM 106 may shut down the engine 102 independently of the state of the motion signal 212. For example, the ECM 106 may shut down the engine 102 while the vehicle is still in motion.

When the vehicle is not in motion, the transmission 110 is not in park, and the user interacts with the combination park and ignition switch 205, the shift control module 235 shifts the transmission 110 to park and the ignition control module 230 may shutdown the engine 102. Specifically, when the motion signal 212 is in the second state, the current range signal 232 indicates that the transmission 110 is not in park, and the park and ignition signal 207 is in the first state, the shift control module 235 may set the shift signal 237 to a second state. In response to the shift signal 237 being set to the second state, the TCM 114 shifts the transmission 110 to park. Additionally, if the configuration signal 226 is in the first state, the ignition control module 230 transitions the ignition state 231 from run to off. Alternatively, if the configuration signal 226 is in the second state and the second timer signal 221 is in the second state, the ignition control module 230 transitions the ignition state 231 from run to off. In response to the ignition control module 230 transitioning the ignition state 231 to off, the ECM 106 shuts down the engine 102.

When the vehicle is not in motion, the transmission 110 is in park, and the user interacts with the combination park and ignition switch 205, the ignition control module 230 shuts down the engine 102. Specifically, when the motion signal 212 is in the second state, the current range signal 232 indicates that the transmission 110 is in park, the configuration signal 226 is in the first state, and the park and ignition signal 207 is in the first state, the ignition control module 230 may transition the ignition state 231 from run to off. In response to the ignition control module 230 transitioning the ignition state 231 to off, the ECM 106 shuts down the engine 102.

When the engine 102 is off and the user interacts with the combination park and ignition switch 205, the ignition control module 230 starts the engine 102. Specifically, when the park and ignition signal 207 transitions to the first state while the engine 102 is off, the ignition control module 230 may transition the ignition state 231 to crank. In response to the ignition state 231 being set to crank, the BCM 150 closes the starter switch 172 and supplies power from the second battery 171 to the starter motor 173 to start the engine 102.

When the ignition switch 206 is included, the ignition control module 230 may also set the ignition state 231 independently from the park and ignition signal 207, the motion signal 212, the first timer signal 216, the second timer signal 221, the configuration signal 226, and the current range signal 232 based on actuation of the ignition switch 206. For example, the ignition control module 230 may set the ignition state 231 to crank in response to user interaction with the ignition switch 206 while the engine 102 is off. The ignition control module 230 may set the ignition state 231 to off or accessory in response to user interaction with the ignition switch 206 while the engine 102 is on.

Figure 3:
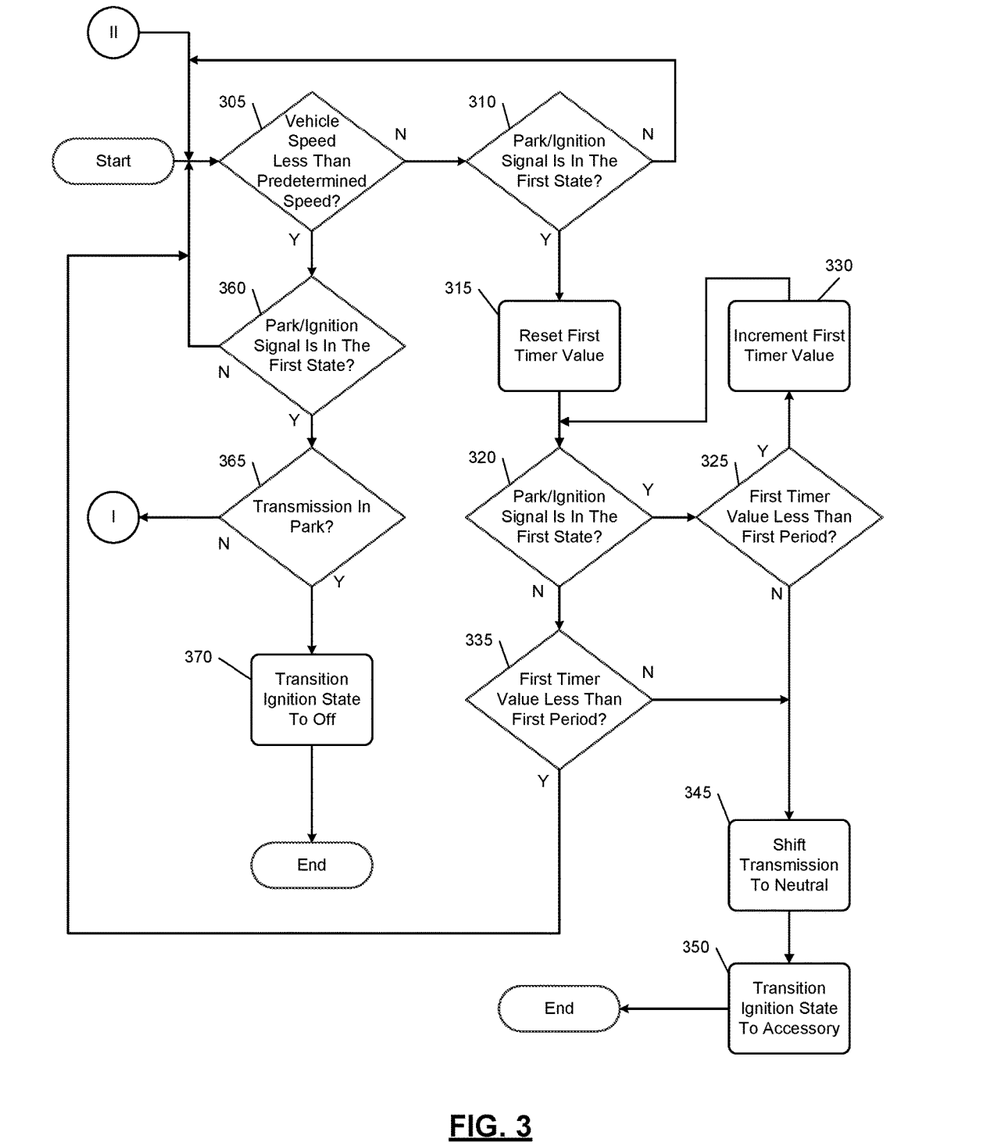
FIGS. 3-4 are a flowchart depicting an example method of controlling both a transmission and an engine of a vehicle based on input from a combination park and ignition switch.
Figure 4:
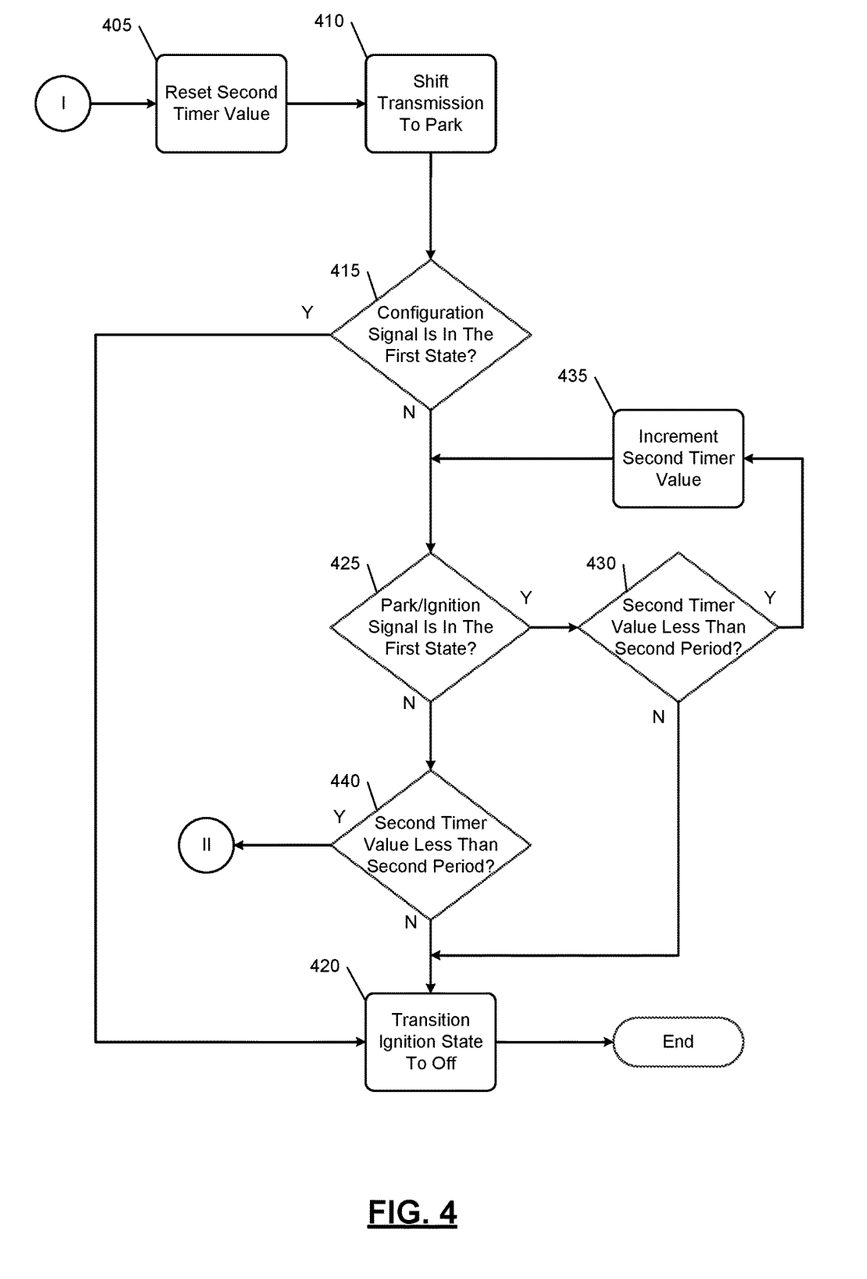

FIGS. 3-4 are a flowchart depicting an example method of controlling the transmission 110 and the engine 102 based on input from the combination park and ignition switch 205. Control begins with 305 when the engine 102 is on and combusting air and fuel. The vehicle may either be moving or not moving when control begins.

At 305, the vehicle speed module 210 determines whether the vehicle speed is less than the predetermined speed. If 305 is true, the vehicle speed module 210 sets the motion signal 212 to the second state, and control continues with 360, which is discussed further below. The motion signal 212 being in the second state indicates that the vehicle is not in motion. If 305 is false, the vehicle speed module 210 sets the motion signal 212 to the first state, and control continues with 310. The motion signal being in the first state indicates that the vehicle is in motion.

At 310, the ignition control module 230, the shift control module 235, and the first timer module 215 determine whether the park and ignition signal 207 is in the first state. If 310 is false, control returns to 305. If 310 is true, control continues with 315. At 315, the first timer module 215 resets the first timer value and sets the first timer signal 216 to the first state, and control continues with 320. The first timer signal 216 being in the first state indicates that the first timer value is less than the first predetermined period. At 320, the first timer module 215 determines if the combination park and ignition signal 207 is in the first state. If 320 is false, control continues with 335, which is discussed further below. If 320 is true, control continues with 325.

At 325, the first timer module 215 determines if the first timer value is less than the first predetermined period. If 325 is true, the first timer module 215 increments the first timer value at 330, and control returns to 320. If 325 is false, the first timer module 215 sets the first timer signal 216 to the second state, and control continues with 345. The first timer signal 216 being in the second state indicates that the park and ignition signal 207 has continuously been in the first state for at least the first predetermined period.

At 345, the shift control module 235 sets the shift signal 237 to the first state, and control continues with 350. In response to the shift signal 237 being set to the first state, the TCM 114 shifts the transmission 110 to neutral. At 350, the ignition control module 230 transitions the ignition state 231 to accessory. In response to the ignition state 231 being transitioned to accessory, the ECM 106 shuts down the engine 102. Control then ends.

At 335, when the park and ignition signal 207 has transitioned to the second state, the first timer module 215 determines if the first timer value is less than the first predetermined period. If 335 is true, the ignition control module 230 does not transition the ignition state 231 from run and allows the engine 102 to remain on, the TCM 114 does not shift the transmission 110, and control returns to 305. If 335 is false, the first timer module 215 sets the first timer signal 216 to the second state, and control transfers to 345 and continues as described above.

At 360, when the vehicle is not in motion, the ignition control module 230, the shift control module 235, and the second timer module 220 determine if the combination park and ignition signal 207 is in the first state. If 360 is false, control returns to 305. If 360 is true, control continues with 365. At 365, the shift control module 235 determines whether the transmission 110 is in park. For example, the shift control module 235 may determine whether the transmission 110 is in park based on the current range signal 232. If 365 is true, control continues with 370. At 370, the ignition control module 230 transitions the ignition state 231 to off. In response the ignition state 231 being transitioned to off, the ECM 106 shuts down the engine 102. Control then ends. If 365 is false, control continues to 405 of FIG. 4.

At 405 (FIG. 4), the second timer module 220 resets the second timer value and sets the second timer signal 221 to the first state, and control continues with 410. The second timer signal 221 being in the first state indicates that the second timer value is less than the second predetermined period. At 410, the shift control module 235 sets the shift signal 237 to the second state, and control continues with 415. In response to the shift signal 237 being set to the second state, the TCM 114 shifts the transmission 110 to park.

At 415, the ignition control module 230 may determine whether the configuration signal 226 is in the first state. If 415 is true, control transfers to 420. At 420, the ignition control module 230 transitions the ignition state 231 to off. In response to the ignition state 231 being transitioned to off, the ECM 106 shuts down the engine 102. Control then ends. If 415 is false, control continues with 425.

At 425, the second timer module 220 determines whether the combination park and ignition signal 207 is in the first state. If 425 is false, control continues with 440, which is described further below. If 425 is true, control continues with 430. In various implementations, 415 may be omitted, and control may continue with 425 from 410.

At 430, the second timer module 220 determines if the second timer value is less than the second predetermined period. If 430 is true, the second timer module 220 increments the second timer value at 435, and control returns to 425. If 430 is false, the second timer module 220 sets the second timer signal 221 to the second state, and control continues with 420 as discussed above. The second timer signal 221 being set to the second state indicates that the second timer value is equal to or greater than the second predetermined period.

At 440, when the combination park and ignition signal 207 has transitioned to the second state, the second timer module 220 determines whether the second timer value is less than the second predetermined period. If 440 is true, the ignition control module 230 does not transition the ignition state 231 from run and allows the engine 102 to remain on, and control returns to 305 of FIG. 3. If 440 is false, the second timer module 220 sets the second timer signal 221 to the second state, and control continues with 420, as discussed above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A drive control system of a vehicle, comprising:
a vehicle speed module configured to:
  determine whether the vehicle is moving;
  set a first signal to a first state when the vehicle is not moving; and
  set the first signal to a second state when the vehicle is moving;
a shift control module configured to:
  shift a transmission of the vehicle based on a second signal from a range selector; and
  independently of the second signal from the range selector, selectively shift the transmission of the vehicle when a third signal from a combination park and ignition switch is in a first state; and
an ignition control module configured to, when the first signal is in the first state and the transmission of the vehicle is in park, shut down an engine of the vehicle when the third signal from the combination park and ignition switch is in the first state.

2. The drive control system of claim 1, wherein the vehicle does not include any ignition switches other than the combination park and ignition switch.

3. The drive control system of claim 1, wherein the shift control module is configured to shift the transmission of the vehicle based on the second signal from the range selector both when the first signal is in the first state and when the first signal is in the second state.

4. The drive control system of claim 1, further comprising a first timer module configured to set a fourth signal to a first state when the third signal is in the first state continuously for a first predetermined period,
wherein the shift control module is configured to shift the transmission to neutral when the fourth signal is in the first state, the first signal is in the second state, and the transmission is not in park.

5. The drive control system of claim 4, wherein the ignition control module is configured to shut down the engine of the vehicle when the fourth signal is in the first state and the first signal is in the second state.

6. The drive control system of claim 1, wherein the shift control module is configured to shift the transmission of the vehicle to park when the first signal is in the first state, the third signal is in the first state, and the transmission of the vehicle is not in park.

7. The drive control system of claim 6, further comprising a second timer module configured to set a fifth signal to a first state when the third signal from the combination park and ignition switch is in the first state continuously for a second predetermined period,
wherein the ignition control module is further configured to shut down the engine of the vehicle when the first signal is in the first state and the fifth signal is in the first state.

8. The drive control system of claim 1, wherein the ignition control module is configured to start the engine of the vehicle when the third signal from the combination park and ignition switch is in the first state and the engine is off.

9. The drive control system of claim 8, wherein the ignition control module is configured to start the engine of the vehicle when the third signal from the combination park and ignition switch is in the first state, the engine is off, and the transmission of the vehicle is in one of park and neutral.

10. The drive control system of claim 1 wherein the vehicle speed module is configured to:
set the first signal to the first state when a speed of the vehicle is less than a predetermined speed; and
set the first signal to the second state when the speed of the vehicle is greater than or equal to the predetermined speed.

11. The drive control system of claim 1 wherein:
the shift control module is configured to, when the first signal is in the first state and the transmission is not in park, shift the transmission to park in response to the third signal from the combination park and ignition switch transitioning to the first state; and
the ignition control module is configured to, when the first signal is in the first state and the transmission is not in park, shut down the engine in response to the third signal from the combination park and ignition switch remaining in the first state continuously for a first predetermined period.

12. The drive control system of claim 11 wherein:
the shift control module is configured to, when the first signal is in the second state and the transmission is not in park, shift the transmission to neutral in response to the third signal from the combination park and ignition switch remaining in the first state continuously for a second predetermined period; and
the ignition control module is configured to, when the first signal is in the second state and the transmission is not in park, shut down the engine in response to the third signal from the combination park and ignition switch remaining in the first state continuously for the second predetermined period.

13. The drive control system of claim 1 wherein:
the shift control module is configured to, when the first signal is in the first state and the transmission is not in park, shift the transmission to park in response to the third signal from the combination park and ignition switch transitioning to the first state; and
the ignition control module is configured to, when the first signal is in the first state and the transmission is not in park, shut down the engine in response to the third signal from the combination park and ignition switch transitioning to the first state.

14. The drive control system of claim 13 wherein:
the shift control module is configured to, when the first signal is in the second state and the transmission is not in park, shift the transmission to neutral in response to the third signal from the combination park and ignition switch remaining in the first state continuously for a second predetermined period; and the ignition control module is configured to, when the first signal is in the second state and the transmission is not in park, shut down the engine in response to the third signal from the combination park and ignition switch remaining in the first state continuously for the second predetermined period.

15. The drive control system of claim 1 further comprising:

the range selector; and the combination park and ignition switch, wherein the combination park and ignition switch is configured to:

set the third signal to the first state in response to user input to the combination park and ignition switch; and set the third signal to a second state in response to no user input to the combination park and ignition switch.

16. A drive control method for a vehicle, comprising:

determining whether the vehicle is moving;

in response to determining that the vehicle is not moving, setting a first signal to a first state;

in response to determining that the vehicle is moving, setting the first signal to a second state;

shifting a transmission of the vehicle based on a second signal from a range selector;

independently of the second signal from the range selector, selectively shifting the transmission of the vehicle when a third signal from a combination park and ignition switch is in a first state; and shutting down an engine of the vehicle when the first signal is in the first state, the transmission of the vehicle is in park, and the third signal from the combination park and ignition switch is in the first state.

17. The drive control method of claim 16, further comprising setting a fourth signal to a first state when the third signal is in the first state continuously for a first predetermined period, wherein selectively shifting the transmission of the vehicle when the third signal from the combination park and ignition switch is in the first state includes shifting the transmission to neutral when the fourth signal is in the first state, the first signal is in the second state, and the transmission of the vehicle is not in park.

18. The drive control method of claim 17, further comprising shutting down the engine of the vehicle when the fourth signal is in the first state and the first signal is in the second state.

19. The drive control method of claim 16, wherein selectively shifting the transmission of the vehicle when the third signal from the combination park and ignition switch is in the first state includes shifting the transmission to park when the first signal is in the first state and the transmission of the vehicle is not in park.

20. The drive control method of claim 16, further comprising:

setting a fifth signal to a first state when the third signal is in the first state continuously for a second predetermined period, and shutting down the engine of the vehicle when the first signal is in the first state and the fifth signal is in the first state.

* * * * *